United States Patent [19]

Mazelsky

[11] 3,851,374

[45] Dec. 3, 1974

[54] METHOD OF ASSEMBLYING ENERGY ABSORBERS

[75] Inventor: Bernard Mazelsky, West Covina, Calif.

[73] Assignee: ARA Products, Inc., West Covina, Calif.

[22] Filed: Dec. 1, 1972

[21] Appl. No.: 311,299

[52] U.S. Cl.................... 29/455, 29/456, 29/464, 74/492, 188/1 R
[51] Int. Cl...................... B21d 39/00, B23p 19/04
[58] Field of Search ............ 29/505, 446, 455, 450, 29/456, 464, 235; 188/1 R; 74/492

[56] References Cited
UNITED STATES PATENTS

| 1,935,999 | 11/1933 | Tessky | 29/455 UX |
| 2,080,722 | 5/1937 | Lee | 29/235 X |
| 2,138,144 | 11/1938 | Dodge | 29/235 |
| 2,329,000 | 9/1943 | Rembert | 29/235 X |
| 3,089,520 | 5/1963 | Huet | 29/455 UX |
| 3,369,634 | 2/1968 | Mazelsky | 74/492 X |
| 3,478,408 | 11/1969 | Brown | 29/505 X |

Primary Examiner—Charlie T. Moon
Attorney, Agent, or Firm—Herzig & Walsh Incorporated

[57] ABSTRACT

Methods of assembling energy absorbers of the type comprising telescoping tubes having a helically wound energy absorbing element between the tubes. The basic method comprises the steps of helically winding the convolutions of wire onto the inner telescoping tube and fitting the tubes in telescoping relationship with the helical winding between them. Variations are possible in the order of execution of the steps and also in the details of the steps.

8 Claims, 12 Drawing Figures

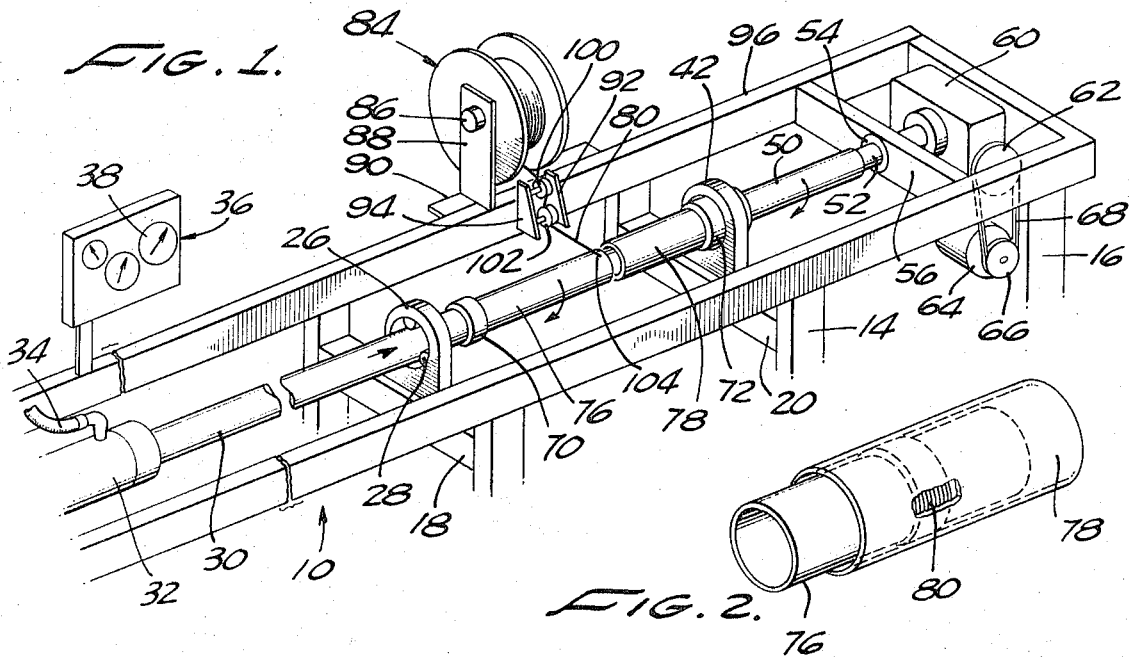
FIG. 1.
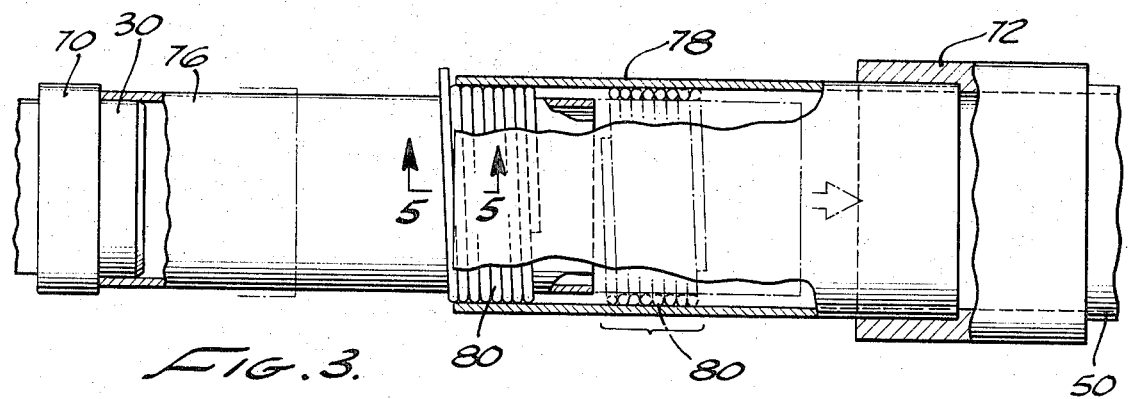
FIG. 2.
FIG. 3.
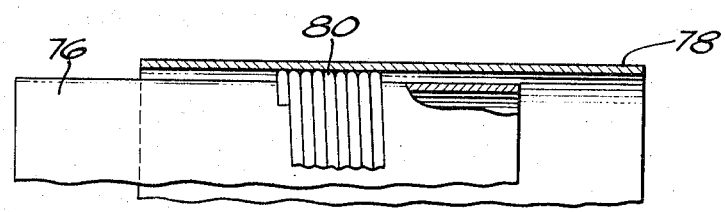
FIG. 4.
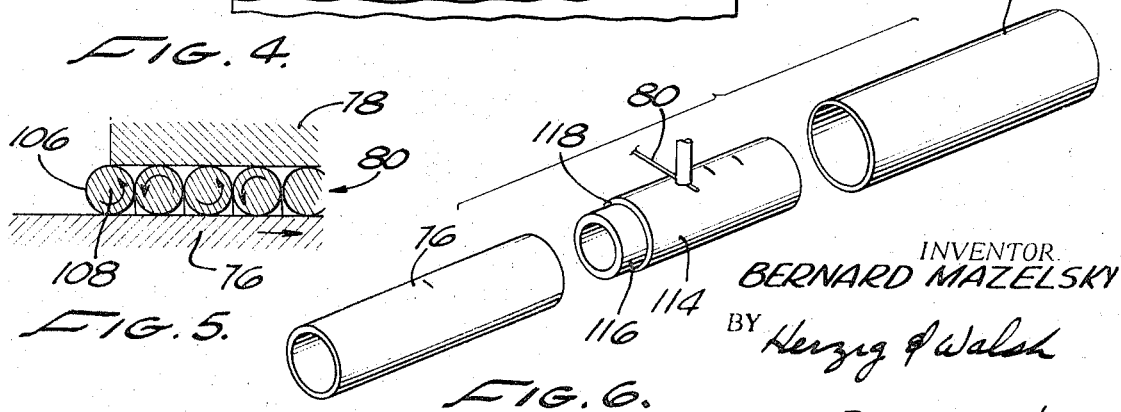
FIG. 5.
FIG. 6.
INVENTOR.
BERNARD MAZELSKY
BY Herzig & Walsh
ATTORNEYS

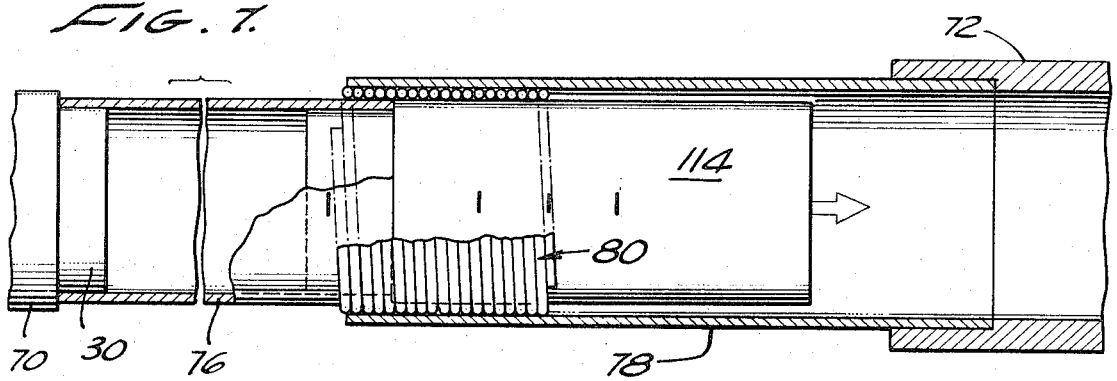
FIG. 7.
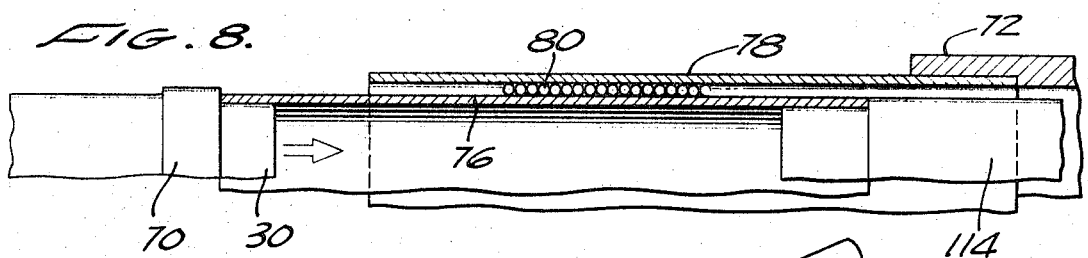
FIG. 8.
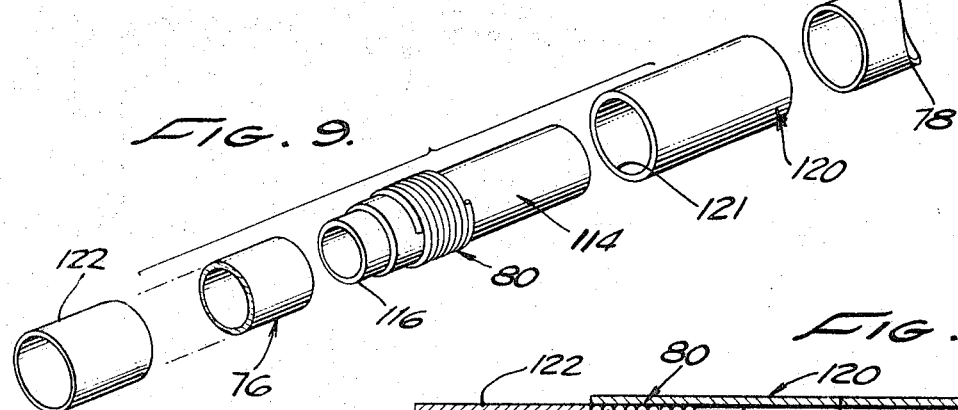
FIG. 9.
FIG. 10.
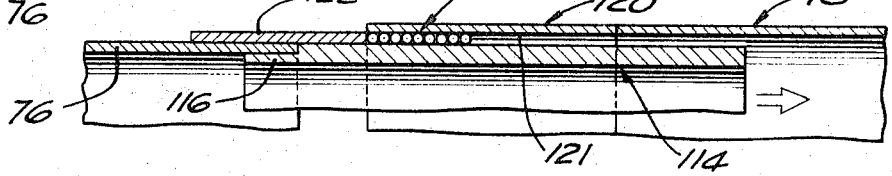
FIG. 11.
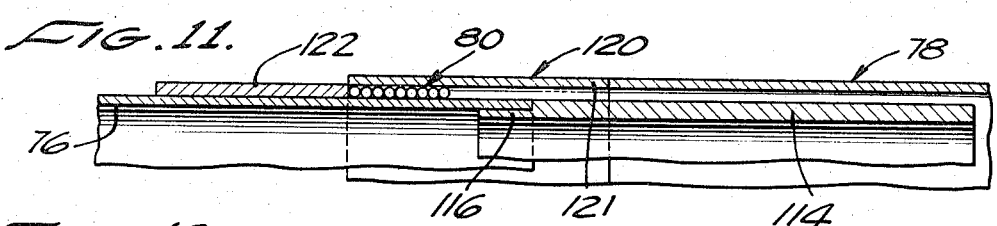
FIG. 12.
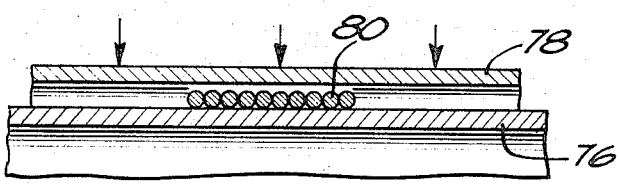
INVENTOR.
BERNARD MAZELSKY
BY Herzig & Walsh
ATTORNEYS

METHOD OF ASSEMBLYING ENERGY ABSORBERS

SUMMARY OF THE INVENTION

The invention relates to methods of assembling energy absorbers and, more particularly, energy absorbers of the type such as shown in U.S. Pat. No. 3,369,634. Basically, this type of energy absorber comprises telescoping cylindrical members with an annular space between them. The energy absorbing elements are positioned in the space between the telescoping members. The herein invention is directed more particularly to methods of assembling that type of energy absorber wherein the energy absorbing member or means between the telescoping members is in the form of a helically wound wire having a plurality of convolutions. As explained in the prior patent referred to, when the telescoping members are moved axially relatively to each other, cyclic deformations of the convolutions of helically wound wires occurs. The convolutions rotate about their toroidal axes, that is, the internal central axis of the wire.

As will be understood from the prior patent referred to, the energy absorber may be constructed in various sizes, the annular space between the telescoping members having a given dimension radially. This dimension is such that the convolutions of the helical wire member in between are frictionally gripped or engaged by the telescoping members. Substantial amounts of energy are absorbed or dissipated as a result of the cyclic deformation of the wire convolutions when the telescoping members are moved axially relative to each other.

The herein invention embodies the concept and discovery of methods of assembling the energy absorber whereby the finished assembled product possesses the desired configuration and is otherwise ready for installation where needed. As can be appreciated, when considering the fabrication and production of many thousands of energy absorbers for industrial use, there was a compelling need for methods of assembly appropriate to the circumstances and conditions involved. The primary object of the invention is to provide and make available a method for assembling the energy absorbers characterized in that the method is simple, economical, easy to execute, and results in a finished product having the desired relationship between the parts.

A further object is to provide a method as is referred to in the foregoing, including the basic steps of helically winding the wire element and positioning the wire element in the annulus between the inner cylindrical member and the outer telescoping cylindrical member. Preferred exemplary forms of the method of the invention are described in detail hereinafter. The several forms of the method differ in detail in some instances in the order of execution of the steps and in other instances, in details of the steps themselves.

A further object is to provide a method as described in the foregoing wherein the helical wound wire is simultaneously wound on the inner telescoping member of the absorber while the outer telescoping member is being forced axially over the helix on the inner member. In other words, the winding and relative axial movements are done at the same time.

Another object is to provide a method as in the foregoing to facilitate the handling of the parts, wherein the ends of the helically wound wire are temporarily tack welded, bonded, or cemented to the inner telescoping member.

A further object is to provide a method as in the foregoing, including the steps of inserting a dummy telescoping member into the end of the inner telescoping member of the absorber and winding the helical member on it; after which, the dummy member with the winding and the inner telescoping tubular member are forced into the outer telescoping cylindrical member. Then, the dummy member is withdrawn.

In another form of the invention, the winding of the helical member is done as a separate step. This may be done automatically on a separate winding machine. The hydraulic thrust machine is then utilized to thrust the inner member with the winding on it into the outer telescoping tube or member. In this form of the invention, additional steps are utilized, including the placement of a holding tube or sleeve around the helical winding on the inner telescoping member. With the assembly in the press, another sleeve or tube is placed behind or in back of the helical winding to prvent it from being shoved rearwardly while the dummy member is pushed out from inside of the helix, and the helix rolling and breaking loose its tack welds or cemented bonds at its ends. The helical winding is held in place while this is going on by the outer sleeve around it. It will be prevented from being pushed rearwardly by the sleeve, that is, on the outside of the winding and behind it. A further object of the invention is to provide a method embracing these particular steps.

Another object of the invention is to provide a variation of the method wherein the helical winding is first made on the inner telescoping member. The outer telescoping member is heated to expand it, and it is then placed over the inner telescoping member and the winding. It is allowed to cool and shrink so that it grips the helical winding between the telescoping members.

BRIEF DESCRIPTION OF THE DRAWINGS

Further objects and additional advantages of the invention will become apparent from the following detailed description and annexed drawings, wherein:

FIG. 1 is a schematic perspective view of a machine on which the steps of the method can be executed, the machine providing means for rotating the parts during assembly and means for exerting an axial thrust;

FIG. 2 is a perspective view of an assembled energy absorber;

FIG. 3 is a sectional view of an absorber during assembly to the first example of the method;

FIG. 4 is a partial sectional view of an absorber during assembly in accordance with the first example of the method;

FIG. 5 is a sectional view taken along the line 5-5 of FIG. 3;

FIG. 6 is an exploded view illustrating the second example of the method of the invention;

FIG. 7 is a cross sectional view of an absorber further illustrating the second example of the method;

FIG. 8 is a sectional view further illustrating the second example of the method;

FIG. 9 is an exploded view illustrating the third example of the method;

FIG. 10 and 11 are sectional views illustrating the third example of the method; and FIG. 12 is a sectional view of an absorber illustrating the fourth example of the method.

DESCRIPTION OF THE PREFERRED EMBODIMENTS

Example No. 1

Referring to the drawings, FIG. 1 shows diagrammatically a preferred form of machine or apparatus in or on which the method can be executed. Numeral 10 designates a rectangular frame or bed supported by standards or uprights designated generally at 12, 14, and 16. Extending between uprights on opposite sides of the machine are transverse or horizontal members 18 and 20.

Transverse member 18 supports a pedestal bearing 26 which carries rollers shown at 28 and journalled in this bearing is cylindrical ram 30 which is movable axially within hydraulic cylinder 32 to which hydraulic fluid may be supplied by hydraulic lines, one of which is shown at 34. Hydraulic cylinder 32 and its control are conventional. Numeral 36 designates a panel or instrument board having instruments mounted on it, including pressure gauge 38 which indicates the hydraulic pressure present in cylinder 32.

Supported on transverse member 20, there is another pedestal bearing 42 in which is journalled a cylindrical stem as designated at 50 from which extends another cylindrical stem 52 of smaller diameter that is journalled in bearing 54 in transverse member 56. The end of stem 52 extends into a gear box or gear train 60 driven by pulley 62. Numeral 64 designates an electric motor having a drive pulley 66. There is a belt 68 which passes over pulleys 66 and 62 for driving gear box or train 60 and driving cylindrical stem 50.

At the end of ram 30 is a thrust bearing collar 70 of a size to receive or have fitted into it an end of inner cylindrical telescoping member 76 of the energy absorber. At the end of stem 50 adjacent to pedestal bearing 52, there is a collar 72 of a size to receive or have fitted into it the outer cylindrical telescoping member 78. It should be noted that thrust bearing collar 70 allows for rotation of all tubular elements 76, 78, 72, and 50 while the thrust is being applied from ram 30 which does not rotate.

The first example of the method is illustrated in FIGS. 1–5. An absorber of the type referred to is shown in FIGS. 2–4. The inner telescoping member is designated at 76, the outer telescoping member at 78, and the helical wound wire at 80. The absorber shown in FIG. 2 has part of the outer cylindrical member broken away to disclose the helical wire wound in the space in between the telescoping members.

In FIG. 1, numeral 84 designates a reel having wire 80 wound on it. The reel is rotatable by spindle or arber 86 supported by uprights such as 88 extending from platform 90. Numerals 92 and 94 designate brackets positioned on the inside of one of side longitudinal frame members 96. There are two small grooved rollers 100 and 102 journalled on axles or stems extending between brackets 92 and 94. Wire 80 passes between the rollers and is guided as shown. The end of it extends outwardly to telescoping member 76 to which it is tack welded at a point designated 104. In the execution of the method, the end of telescoping member 76 is telescoped into the end of outer telescoping member 78 after the end of wire 80 has been tack welded, cemented, or bonded at a point 104. This is done while motor 64 is energized to drive and rotate stem 50. At the same time, hydraulic cylinder 32 is controlled to begin the axial thrust of ram 30 to thrust inner member 76 into outer member 82. FIG. 3 illustrates the progress of the assembly in accordance with the steps of this example of the method. The wind is being made at the same time that member 76 with the helix being wound on it is being thrust into outer telescoping member 78. It will be understood that while these steps are occurring, the convolutions of the helical wind rotate about their own toroidal axes, that is, the internal axis of the wire. In FIG. 4, one convolution is designated at 106, and its internal toroidal axis at 108. FIG. 3 shows helical wind 80 at a position in the end of outer telescoping member 78 and the position it takes farther into member 78 as the assembly progresses. The broken lines show a preferred position of the inner and outer telescoping members and the helical wind in the finished condition of the absorber. Also illustrated in FIGS. 2 and 4, the relative axial movement is designated by the large arrows. When the desired amount of wire has been wound onto inner telescoping member 76, the wire is cut off; and the cut off end also is tack welded, cemented, or bonded to inner member 76. This end proceeds into the annular space between the telescoping members. It will be understood that with the helical wind in the annulus between the telescoping members, the tack welds or cemented bonds then break loose because of the rolling action of the convolutions of the wire and the cyclic deformation of the material of the wire.

While the foregoing explains the first example of the method with reference to wire helically wound in the annular space between the telescoping members, the method could be similarly applied in the instance or circumstance wherein instead of helically wound wire, the energy absorbing means is constituted by individual toroidal or ring-shaped elements.

Example 1 produces the configuration of absorbers as shown in FIG. 2 wherein there is overlap between the inner and outer tubes 76 and 78 at the right end without helical wire at the overlap. The overlap is present because while tubes 76 and 78 are moving axially relatively, the wire helix moves at one-half of the relative speed of the tubes. In many installations, this is a disadvantage. However, example 2 of the method eliminates the overlap.

Example No. 2

This form of the method is illustrated in FIGS. 6 through 8. It may be executed on the same machine as illustrated in FIG. 1. In executing this form of the invention, an additional part is utilized which is the dummy core or sleeve part 114. It has an extending end part 116 of smaller diameter, being of a size to fit into the inner telescoping member 76 as shown with annular shoulder 118 between the parts of different diameter. The outside diameter of the part of core 114 of larger diameter is the same as the outside diameter of the inner telescoping member 76.

In executing this form of the method, the inner and outer telescoping members are fitted into the machine (FIG. 1) as previously described in connection with the first example of the method. End part 116 of dummy 114 is inserted into inner telescoping member 76 as illustrated in FIGS. 7 and 8. The end of wire 80 is tack welded, cemented, or bonded to dummy 114 as shown in FIG. 6. With stem 50 rotating and axial thrust being applied on ram 30 by hydraulic cylinder 32, the helical wind is initially made on dummy 114, the parts being as shown in FIG. 7 shortly after the start of the wind. The wire is initially wound onto dummy 114; and as the axial thrust between inner and outer members 76 and 78 continues, the helical wind of wire is forced off dummy 114 and onto inner member 76 as illustrated in FIGS. 7 and 8. When the desired relationship between the inner and outer members and the wind has been arrived at, the parts can be removed from the machine and dummy 114 then removed.

This form of the method results in a configuration without the overlap of tubes 76 and 78 without wire in the annulus, the (absent) overlap being represented by removed dummy 114. This configuration has the advantage of allowing a longer energy absorbing stroke in an absorber of minimum length.

Example No. 3

This form of the method is illustrated in FIGS. 9, 10, and 11. This form of the invention uses dummy tube 114 of FIG. 6; and additionally, it uses holding sleeve 120 which preferably has a cross section as shown in FIG. 10. It has an inside diameter 121 to fit around helix 80 to hold the wire radially. Numeral 122 designates another holding sleeve which holds the wire helix axially, as may be seen in FIGS. 10 and 11.

In executing this form of the method, the winding of wire 80 is done as a first and separate step; and this may be done on one or more separate winding machines. There might be several winding machines forming the helical winds, after which, the parts are put in the hydraulic thrust machine of FIG. 1 for completing the assembly. The parts are assembled in the machine as illustrated in FIG. 9 and 10. End 116 of dummy 114 is inserted into inner telescoping member 76. Sleeve 120 is placed on dummy 114 around the helical wind. Sleeve 122 is placed around inner tube 76 and abutting against wire helix 80. Thrust is then applied by ram 30 by controlling hydraulic cylinder 32, and the thrust forces dummy 114 to the right as may be seen in FIG. 10. The helical wind is transferred from dummy 114 onto inner telescoping member 76. The process proceeds as illustrated in FIGS. 10 and 11, sleeve 120 holding the helix radially and sleeve 122 holding it axially so the convolutions do not spread. This form of the method results in the same configuration as that of example no. 2.

Sleeve 122 may be biased during the assembly by being manually pushed or by a biasing spring not shown. Only enough bias is needed to prevent the wire convolutions from spreading axially.

Example No. 4.

This form of the method is illustrated in FIG. 12. In this form of the invention, in executing the method, the helical wind of wire 80 is first made on inner telescoping member 76. Outer telescoping member 78 is heated in a suitable furnace to expand it due to thermal expansion to a diameter such that it will easily slip over helical winding 80 on inner telescoping member 76 in any desired position. Member 76 with the helical winding thereon and member 78 are brought together by conveyor means to a suitable point at which the outer member is simply slipped over the inner member and the helical wind and then allowed to cool so that the helical winding is gripped in the annular space between the inner and outer telescoping members.

From the foregoing, those skilled in the art will readily understand the nature of the invention, the manner in which the method is executed, and the manner in which all of the objects set forth are achieved and realized.

The foregoing disclosure is representative of preferred forms of the invention and is to be interpreted in an illustrative rather than a limiting sense, the invention to be accorded the full scope of the claims appended hereto.

What is claimed is:

1. A method of assembling energy absorbers of the type comprising cylindrical telescoping members having circular energy absorbing means in the annular space between the members, comprising the steps of: positioning the circular elements adjacent to each other about an axis by winding a continuous element into convolutions about a cylindrical dummy member having an axis coinciding with said axis; aligning the inner and outer telescoping members with said axis; positioning said dummy member between said telescoping members; and moving the inner and outer telescoping members axially relatively to push the circular elements axially off said dummy member and onto said telescoping member in a position between said telescoping members thereby to cause the circular elements to be positioned in the annular space between the telescoping members.

2. The method as in claim 1, including the step of positioning the circular elements by winding continuous elongated elements into a helix having convolutions of the same size about said axis.

3. The method as in claim 1, including the step of continuing to push the telescoping members together and then removing the dummy member.

4. A method as in claim 3, including radially holding the circular elements while moving them axially.

5. A method as in claim 1, including holding the circular elements together axially while pushing them off the dummy member.

6. The invention defined in claim 1, including radially holding the circular elements while moving them axially.

7. The invention defined in claim 6, including holding the circular elements together axially while pushing them off the dummy member.

8. The invention defined in claim 7, including the step of continuing to push the telescoping members together and then removing the dummy member.

* * * * *